Sept. 29, 1942.   N. GAMBURG   2,296,916
COMBINED WILD GRASS ROOT AND GRASS EXTRACTING TOOL AND HOE
Filed Feb. 21, 1941
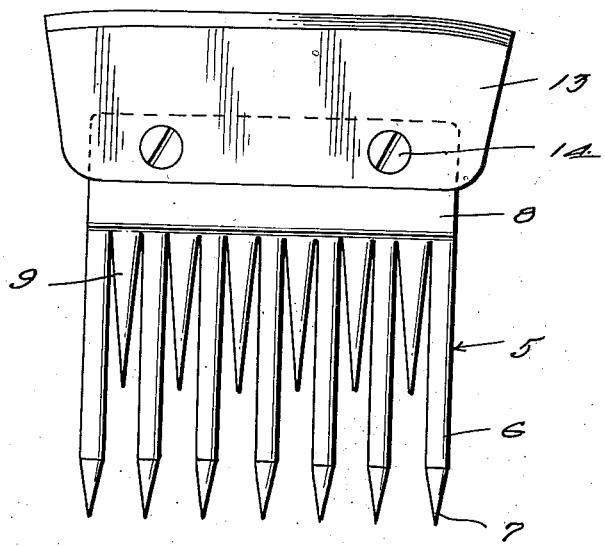
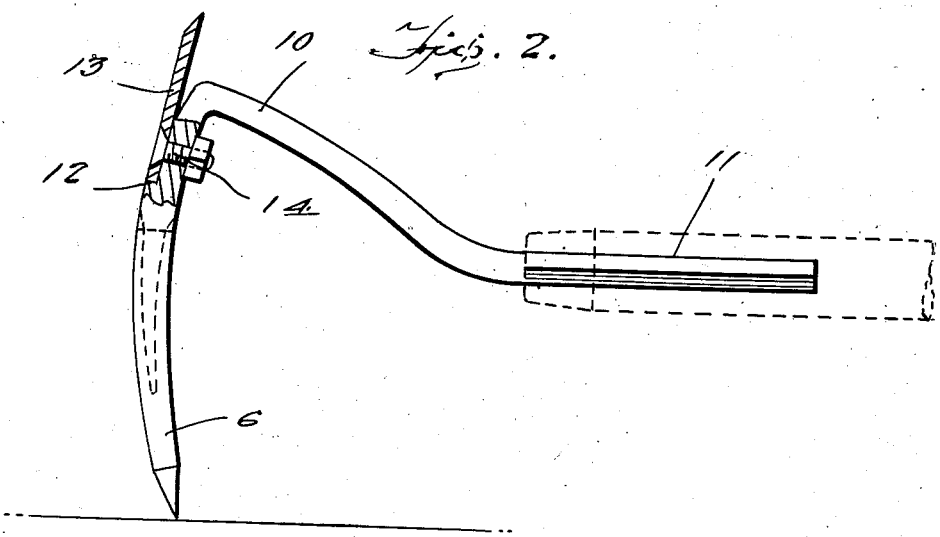
Inventor
Nathan Gamburg
By Clarence A. O'Brien
Attorney Patented Sept. 29, 1942

2,296,916

UNITED STATES PATENT OFFICE 2,296,916

COMBINED WILD GRASS ROOT AND GRASS EXTRACTING TOOL AND HOE

Nathan Gamburg, Shreveport, La.

Application February 21, 1941, Serial No. 380,041

1 Claim. (Cl. 97—62)

The present invention relates to new and useful improvements in garden tools and has for its primary object to provide a combined wild grass root and plant extracting tool and improved hoe. The extracting tool is in the form of a toothed implement adapted for removing wild grass, including the roots, without permitting the separation of the mass of roots from the grass. The object is accomplished by the action of the toothed implement penetrating into the mass of grass just above, at or just below the surface of the soil and grasping or securing the various stems, leaves, roots and similar members thereof.

A further object is to provide a tool of this character of simple and practical construction, which is efficient and reliable in performance, relatively inexpensive to manufacture and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout and in which—

Figure 1 is a front elevational view, and

Figure 2 is a side elevational view with parts broken away and shown in section.

Referring now to the drawing in detail, the numeral 5 designates the grass removing tool generally which includes the plurality of spaced parallel teeth or tines 6 which are pointed at one end as shown at 7 and connected at their opposite ends by the head or plate member 8. Preferably the tines are curved as shown in Figure 2 of the drawing.

Positioned between the tines 6 are the relatively short tapering teeth 9 which substantially close the space between each pair of the teeth 6 at their point of junction with the head 8, the teeth 9 likewise being formed integrally with the head.

Rising from the upper edge of the head or plate 8 and extending rearwardly therefrom is the shank 10 which is inserted in the handle 11 and secured therein in any suitable manner.

The front upper surface of the head or plate 8 is stepped or rabbeted to form the shoulder 12 against which is positioned the rear edge of the hoe blade 13 and secured flatwise against the stepped portion of the head by bolts 14. The front surface of the hoe blade and the front surface of the plate are flush, as shown in Figure 2 of the drawing.

The edge of the hoe projects beyond the edge of the head or plate 8, as well as beyond the shank 10 in a direction opposite to the tines 6 so that the hoe blade may be used by inverting the position of the tool from that shown in Figure 2.

The tines or teeth 6 are adapted for penetrating into the head of the roots of wild grass and similar growths so that the tines may pry into the head of the roots of the grass to loosen the same from the soil and the teeth 9 will likewise engage the roots, stem, etc. and prevent separation of the roots from the grass while the mass of roots are completely removed.

It is believed the details of construction, advantages and manner of use of the tool will be readily understood from the foregoing without further detailed explanation.

Having thus described the invention, what I claim is:

A wild grass root and grass extracting tool comprising a substantially flat head portion, a plurality of tines projecting in parallel relation from one edge of the head portion, said tines being round in cross-section and having a tapered pointed extremity and a plurality of teeth likewise projecting from said edge of the head portion and spaced between said tines, said teeth being of conical formation and extending in the plane of the tines with the ends of the teeth terminating short of the ends of the tines, the sides of the teeth converging with the sides of the tines toward their inner ends and gradually closing the space between adjacent pairs of the tines.

NATHAN GAMBURG.